United States Patent
Moor et al.

(10) Patent No.: US 7,643,892 B2
(45) Date of Patent: Jan. 5, 2010

(54) HISTORIAN INTEGRATED WITH MES APPLIANCE

(75) Inventors: Crisler Terrill Moor, San Jose, CA (US); John J. Baier, Mentor, OH (US); Kevin Chao, Mountain View, CA (US); Lance Christopher Rodenfels, Fairview Park, OH (US); Richard Lee Ryan, Pleasanton, CA (US); Robert J. McGreevy, Oswego, IL (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 143 days.

(21) Appl. No.: 11/864,376

(22) Filed: Sep. 28, 2007

(65) Prior Publication Data

US 2009/0088871 A1   Apr. 2, 2009

(51) Int. Cl.
*G05B 13/02* (2006.01)
*G06F 19/00* (2006.01)
*G06F 17/50* (2006.01)

(52) U.S. Cl. .............. 700/32; 700/28; 700/31; 700/86; 700/87; 700/96; 703/13; 703/16; 703/20; 703/21; 702/180; 702/181; 702/182; 702/183; 718/103; 718/104; 718/106

(58) Field of Classification Search ............ 700/28–32, 700/86–87, 96; 703/13, 16, 20–21; 702/180–183; 718/103–104, 106
See application file for complete search history.

(56) References Cited

U.S. PATENT DOCUMENTS

| 4,385,349 | A | 5/1983 | Ashford et al. |
| 4,613,952 | A | 9/1986 | McClanahan |
| 5,752,008 | A * | 5/1998 | Bowling ...................... 703/13 |
| 6,317,706 | B1 * | 11/2001 | Saib ............................ 703/27 |
| 6,618,856 | B2 | 9/2003 | Coburn et al. |
| 6,799,148 | B2 * | 9/2004 | Ling et al. .................. 702/188 |
| 7,082,348 | B1 | 7/2006 | Dahlquist et al. |
| 7,233,476 | B2 | 6/2007 | Goldenberg et al. |
| 7,266,476 | B2 * | 9/2007 | Coburn et al. ............... 702/183 |
| 2003/0144746 | A1 * | 7/2003 | Hsiung et al. ................. 700/28 |
| 2006/0209868 | A1 * | 9/2006 | Callaghan ................... 370/428 |
| 2006/0259163 | A1 * | 11/2006 | Hsiung et al. ................. 700/30 |
| 2007/0044539 | A1 * | 3/2007 | Sabol et al. ............... 73/19.01 |
| 2007/0112447 | A1 | 5/2007 | McGreevy et al. |
| 2007/0142941 | A1 | 6/2007 | McGreevy et al. |
| 2007/0213850 | A1 * | 9/2007 | Brenneman et al. ......... 700/33 |
| 2007/0266138 | A1 * | 11/2007 | Spire et al. ................. 709/223 |
| 2008/0262824 | A1 * | 10/2008 | Oslake et al. ................ 703/22 |
| 2009/0007172 | A1 * | 1/2009 | Ahanger et al. .............. 725/36 |

* cited by examiner

*Primary Examiner*—Ramesh B Patel
(74) *Attorney, Agent, or Firm*—Turocy & Watson LLP; William R. Walbrun (57) ABSTRACT

A simulation that integrates historical data and real-time data as a test or simulation tool can capture an entry that relates to a desired output as function points. A determination can intellectually be made as to which activities can achieve the desired output. The activities can be process steps that can represent a workflow that can be automatically implemented by an MES Appliance or other enterprise components. If a simulation reveals that the desired output might not be achieved, a change to one or more function points can be analyzed in an attempt to achieve the desired result. This change can be input into a simulation tool through a feedback loop, for example. Another simulation can performed on the modified data until a determination is made that the desired output can be achieved.

20 Claims, 8 Drawing Sheets

HISTORIAN INTEGRATED WITH MES APPLIANCE

TECHNICAL FIELD

The subject invention relates generally to an industrial process, and more particularly to providing an integrated architecture that provides a data model for controlling one or more processes in an industrial control environment.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers, for example, are programmed by systems designers to operate manufacturing processes through user-designed logic programs or user programs. The user programs are stored in memory and generally executed by the PLC in a sequential manner although instruction jumping, looping and interrupt routines, for example, are also common. Associated with the user program are a multitude of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For example, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company may have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with Food and Drug Administration regulations such as Regulation 21 CFR Part 11. One common solution for recording data includes providing a local recording module that often occupies a slot in a controller backplane such as a PC-Historian, which is an industrial computer for the controller backplane. This includes a platform that provides high speed, time series, data storage and retrieval with both local and remote control processors. The PC-Historian communicates with controllers directly through the backplane and can communicate remotely through a network interface. The PC-Historian allows archiving data from the controller to an Archive Engine, which provides additional storage capabilities.

In general, conventional historian processors enable high-speed real-time data collection by communicating directly with the control processor across the backplane for fast data collection speeds. This includes handling large quantities of data over extended time periods while providing efficient storage and retrieval of process data over extended periods of time. These solutions are generally employed for electronic documentation and provide an audit trail and data flags for tracking modified, inserted, or incomplete data. In order to configure such products, a Graphical User Interface (GUI) can be provided to map controller tags defined in a local or remote processor to a data historian file.

With ever shorter product life-cycles, decreasing product launch times, and increasing product variety, conventional manufacturing processes need quick deployment of tasks while maintaining high product quality and low manufacturing costs. Thus, reducing the amount of downtime, scrap, and other inefficiencies as a direct result of poor planning and implementation of various actions or processes within an industrial control environment can mitigate both inefficiencies and wasted resources.

SUMMARY

The following presents a simplified summary in order to provide a basic understanding of some aspects of the disclosed examples. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection interpreting an entry that relates to a desired output and exposing program elements as function points to extract a program as a single unit. A simulation that integrates historical data and real-time data as a test or simulation tool to capture the entry as function points is provided. Based in part on the simulation, a manufacturing execution system (MES) Appliance can carry out part or all of the business logic associated with an overall workflow. The workflow can be based on the simulation and can relate to the process steps involved with implementing actions to achieve the desired output. The MES Appliance can carry out specific functions through interaction with enterprise components or other components, which may be distributed components. If changes are necessary due to problems discovered while implementing the workflow, adjustments can be dynamically applied.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well known structures and devices are shown in block diagram form in order to facilitate describing these embodiments.

As used in this application, the terms "component," "module," "system," "controller," "device," "hierarchy" and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used.

The various embodiments disclosed herein can operate separately or in conjunction with various systems including Advanced Process control, various business systems, machine or manufacturing execution systems (MES), MES Appliances, and so forth. A MES system can include an Enterprise business system, Quality system, Warehouse and supply chain systems, and so forth. An MES system can include key functions, such as detailed scheduling, work order execution and dispatching, definition management, resource management, data collection, and order management. An MES Appliance can perform processing related to various aspects (e.g., business logic, data storage, and so on), that can be incorporated on software modules that can operate various aspects of a business, manufacturing environment and the like and can operate and be serviced utilizing various information technology resources. The various systems can directly or indirectly derive their value out of configuration and interaction with Manufacturing/Automation systems and/or other MES type systems. Additionally, the various aspects can be employed in an industrial automation environment and/or in other environments in which such aspects are deemed appropriate.

Figure 1:
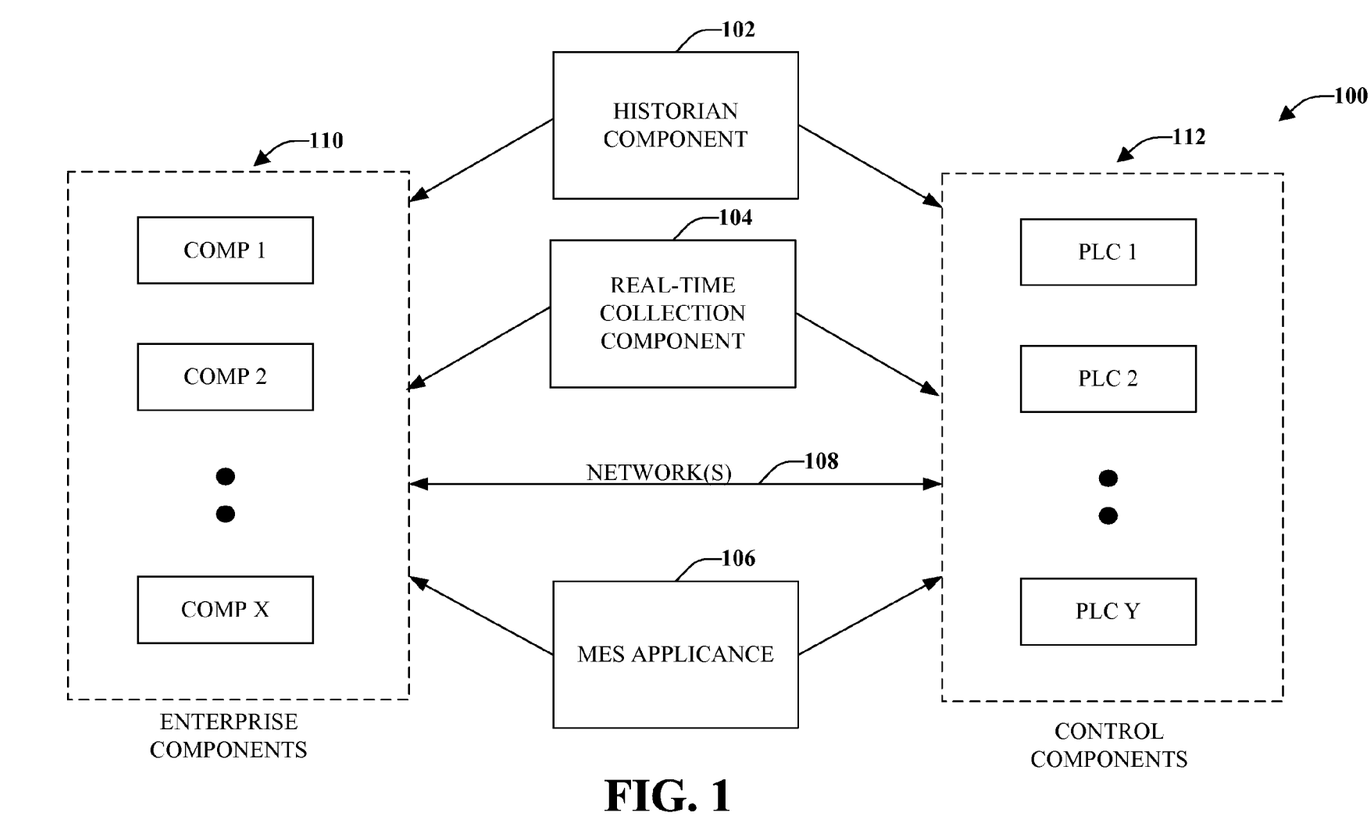
FIG. 1 illustrates a system that facilitates modeling desired outputs based on both historical data and current data and implementing functions associated with the outputs.

Referring initially to FIG. 1, illustrated is a system 100 that facilitates modeling desired outputs based on both historical data and current data and implementing functions associated with the outputs. System 100 can be configured to capture real-time events as well as retain historical information. Based upon an input that indicates a desired outcome, information (both historical and real-time) can be utilized to create a model through simulation of activities that can achieve the desired outcome. If the simulation reveals that current activities cannot achieve the desired outcome, one or more modifications can automatically be made to the model to determine which changes will achieve the desired output. Alterations to the model can be applied automatically, as appropriate, to dynamically configure and implement activities in an industrial control process.

In further detail, a historian component 102, a real-time collection component 104, and an MES appliance 106 can be distributed across a network 108 to provide collective (both historical and current data) and distributed databases as well as modeling various activities. One or more computers or network (e.g., enterprise) components that communicate across network 108 to one or more industrial control components such as programmable logic controllers (PLCs) 112 or other factory components can be included in system 100. Thus, historian components 102 and/or real-time collection components 104 can be operated as singular or collective entities while being viewed, managed and distributed across substantially all or portions of an enterprise and/or PLC 112. For example, at the control levels 112, historian components 102 and/or real-time collection components 104 can be embedded within a PLC rack to collect data, whereas higher levels (e.g., computers or network components 108) can be employed to aggregate data from lower levels. This may include higher level software components that communicate across network 106 to collect data from lower level control components.

System 100 enables combining organizational information such as an organizational or hierarchical data model, which represents a common model of a plant and is distributed among computers of the enterprise 110 and industrial controllers 112, for example. The model can be viewed as an Organizational Data Model—a tree-like hierarchical and heterogeneous structure of organizational Units. For instance, respective Organizational Units may include other Organizational Units. Organizational Units can be either physical locations (e.g., Site, Area) or logical grouping node or collection (e.g., Enterprise as a collection of Sites). The nodes in the organizational hierarchy or model can have associated items representing the plant's production and control equipment, tags, programs, equipment phases, I/O devices, and other application related entities. These organizational units thus can form an application view of the user's system.

A typical system 100 can assign the upper levels of the hierarchy such as an Enterprise node and site to a computer system and the lower levels such as area, line, cell and machine could be contained in multiple industrial controllers each of which can include components which are members of one or more organization units such as area or area model. An organization unit such as area can contain components from one or more controllers. Historian component 102 and/or real-time collection component 104 can be situated at various levels of the enterprise 110 and/or control 112 and can be integrated therein and scaled according to system data collection needs as well as modeling for automatic configuration and implementation of one or more functions or processes.

Adaptability within system 100 is facilitated by data having additional information such as metadata that identifies the purpose of the data. For example, one form of data may identify itself as a control tag that has been marked or labeled with metadata to indicate its significance for data collection purposes. Another type of label or metadata may indicate security information that is being distributed throughout the system 100. Still other types of data may indicate that an alarm condition or an event has occurred within the system and thus, a respective real-time collection component 104 should capture such alarm or event. In general, the organizational model enables both historian components 102 and real-time collection components 104 to receive functionality or data context from system 100 and to expose its respective functionality through a model that can indicate whether various actions will result in a desired output. Based on the model, MES Appliance 106 can create and implement a workflow to carry out functions associated with the workflow, which may be distributed functions.

The enterprise 110 can include various computer or network components such as servers, clients, communications modules, mobile computers, wireless components, and so forth, which are capable of interacting across the network 106. Similarly, the term PLC as used herein can include functionality that can be shared across multiple components, systems, and or networks 108. For example, one or more PLCs 112 can communicate and cooperate with various network devices across the network 108. This can include substantially any type of control, communications module, computer, I/O device, Human Machine Interface (HMI)) that communicate through the network 108 which includes control, automation, and/or public networks. The PLC 112 can also communicate to and control various other devices such as Input/Output modules including Analog, Digital, Programmed/Intelligent I/O modules, other programmable controllers, communications modules, and the like.

Network 108 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In addition to various hardware and/or software components, various interfaces can be provided to manipulate the historian components 102, real-time collection components 104, MES Appliance 106, and organizational data models. This can include a Graphical User Interface (GUI) to interact with the model or other components of the hierarchy such as any type of application that sends, retrieves, processes, and/or manipulates factory or enterprise data, receives, displays, formats, and/or communicates data, and/or facilitates operation of the enterprise 110 and/or PLCs 112. For example, such interfaces can also be associated with an engine, server, client, editor tool or web browser although other types of applications can be utilized.

The GUI can include a display having one or more display objects (not shown) for manipulating the model including such aspects as configurable icons, buttons, sliders, input boxes, selection options, menus, tabs and so forth having multiple configurable dimensions, shapes, colors, text, data and sounds to facilitate operations with the model. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI. It is noted that the organizational model facilitates a single point or client interface, where substantially all historian components 102 and/or real-time collection components 104 within system 100 can be configured and/or operated. This is achieved since data to or from the historian components 102 and/or real-time collection components 104 are exposed and identifies its underlying function and can thus be manipulated from a common interface point or source.

Figure 2:
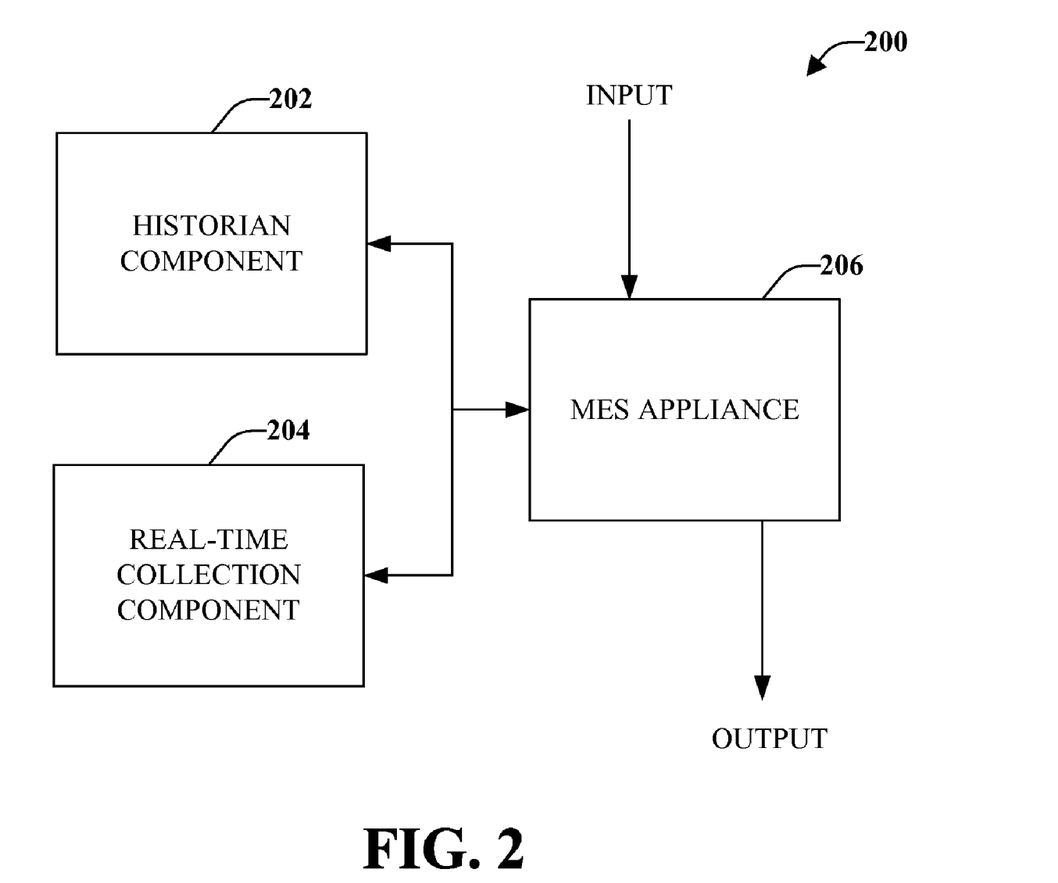
FIG. 2 illustrates an example system that automatically configures and implements one or more processes based on a desired output, historical data, and/or current data.

FIG. 2 illustrates an example system 200 that automatically configures and implements one or more processes based on a desired output, historical data, and/or current data. System 200 can process detailed information relating to activities that should result in a specified end result or output and create a workflow to automatically implement such activities. System 200 can create a model of a workflow and present process variables and the impact that those process variables might have at various points in the process. In accordance with some aspects, system 200 can automatically reconfigure a workflow to mitigate problems associated with process variables. The reconfigured workflow can be automatically implemented.

In further detail, system 200 includes a historian component 202 that can be configured to obtain and retain historical data in accordance with an organizational model of a hierarchical system that is distributed across various elements of an enterprise. The model allows data identified for historian purposes to be automatically collected and also allows historian functionality to be exposed and thus efficiently integrated with other elements of an organization. Such elements include representations of the system that are maintained on higher-level business servers and other representations that serve control elements of the system such as programmable logic controllers and/or other industrial control components. A directory service operates with the organizational model to enable configuration of historian components within the organization and to enable data to be located within the organization. Common organization functionality such as security services can be distributed to the historian components according to the data model and directory service.

A real-time collection component 204 can interface with historian component 202. Real-time collection component 204 can be configured to monitor various process variables, as well as activity currently occurring within one or more areas or process steps. Such collection can be based on visual monitoring, such as by a camera, video recorder, vision system or other device that can capture pictures (still or moving), receive a user input (e.g., key strokes, voice commands, and so forth) or can be another device that can readily monitor or perceive actions or events at substantially the same time as the actions or events occur. Some activities can be observed based on interaction with various components (e.g., machinery, PLCs, computers, and so forth). The data collected by real-time collection component 204 can be relayed to historian component 202 for retention and future analysis.

An MES Appliance 206 can interface with both historian component 202 and real-time collection component 204. MES Appliance 206 can be configured to receive an input from a user and/or entity (e.g., the Internet, another system, a computer, . . . ), hereinafter referred to as users. The input can include a desired end result (e.g., "perform a quality check", "create product according to specifications", and so forth) that can be expressed as a high-level overview or in other terms, such as a goal, outcome, best case scenario, desired result, end product and so forth and can include explicit details relating the desired end result. The input can be expressed in natural language format, input through a keyboard, spoken (e.g., audible), selected from a listed, communicated through drag-and-drop functionality (e.g., icons), or through other manners that can be understood by a PLC, computer, machine, or other device responsible for executing system 200 functions.

Based on the received input and information obtained from historian component 202 and/or real-time collection component 204, MES Appliance 206 can create a model or a conceptual view (e.g., simulate) of one or more process steps that can be used to achieve the desired end result. As process steps are evaluated, adjustments can be automatically made if one or more steps are deemed undesirable and/or based on data collected from historian component 202 and/or real-time collection component 204. In accordance with some aspects, various adjustments are automatically made within an industrial control process based in part on the simulation results.

Based on the simulation, MES Appliance can construct a workflow that details various process steps that can be utilized to achieve a result. Based on the workflow, MES Appliance 206 can automatically interact with one or more distributed business components, such as control components and/or enterprise components. The interaction can implement one or more functions that can be carried out by MES Appliance 206 and/or the business components necessary to achieve the result. The business components can be invoked by MES Appliance 206 according to the constructed workflow (e.g., progressing through process steps within the workflow). If there is a problem experienced while attempting to implement one or more process steps of the workflow, MES Appliance 206 can dynamically alter the workflow and automatically apply the altered process steps. In such a manner, MES Appliance 206 can carry out part or all of the business logic associated with the overall workflow.

Figure 3:
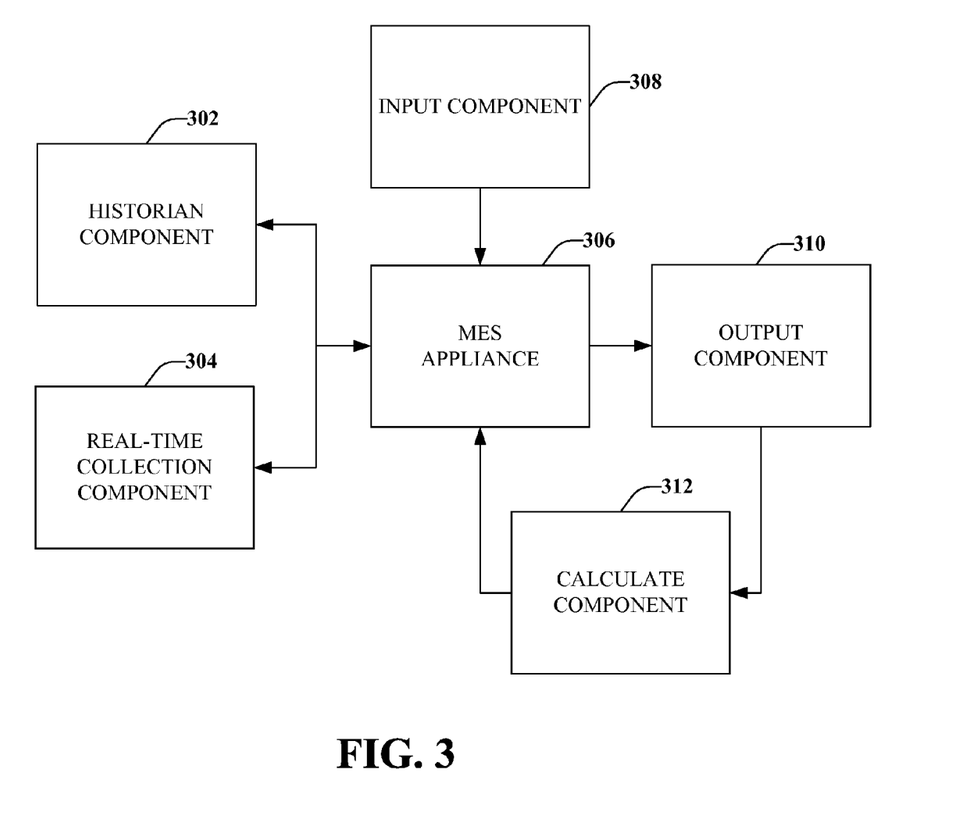
FIG. 3 illustrates an example system that selectively alters one or more processes to achieve a desired outcome.

With reference now to FIG. 3, illustrated is an example system 300 that selectively alters one or more process to achieve a desired outcome. System 300 can be configured to interpret a user program that relates to a desired output and expose program elements as function points to extract the program as a single unit. Included in system 300 is a historian component 302 that can be configured to capture historical data and a real-time collection component 304 that can be configured to observe and record various activities and events as they occur. Information captured by real-time collection component 304 can be relayed to historian component 302, such as once a day, every week, every month, or other time intervals. Either or both historian component 302 and real-time collection component 304 can include a repository for storing information in a retrievable format.

By way of example, and not limitation, the repositories can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of example and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

An MES appliance 306 can be configured to receive a request for an action (e.g., an end result) and can model various process steps to determine which steps are necessary to achieve a desired outcome (e.g., finished product, a step in an industrial process, conforming with business objectives, and so forth) relating to a user program. The model can be utilized to create a workflow, which can be automatically implemented by MES Appliance 306. If the actions necessary to achieve the desired outcome are already known (e.g., has been performed previously), MES Appliance 306 does not need to create a simulation and can automatically apply the actions (e.g., workflow) necessary.

A user or entity can interact with system 300 to provide the desired outcome information through an input component 308, which will be described in further detail below. Communication between the historian component 302, real-time collection component 304, and the MES appliance 306 is bi-directional allowing the MES appliance 306 to retrieve historical data from the historian component 302 and to push current or real-time data (e.g., activities) to the historian as function points are defined and/or modified though simulation or other events.

The MES appliance 306 can perform a simulation or modeling that integrates the historical data and the real-time data as a test or simulation tool to capture the user program as function points. The simulation or model can be communicated to output component 310, which can be configured to dynamically present the results to the user. In such a manner, MES appliance 306 and/or output component 310 can make a determination as to whether current activities will achieve a desired result.

If the simulation reveals that the desired output might not be achieved, a calculate component 312 can determine or calculate a change to one or more function points to achieve the desired result. This change can be input into the simulation tool or MES appliance 306 through a feedback loop, for example. Another simulation can be performed on the modified data until a determination is made that the desired output can be achieved. The information or process steps that are determined to achieve the output are utilized by MES Appliance 306 to create an MES workflow. If further simulations indicate that the desired output cannot be achieved, information can be presented to the user to modify the request and/or to provide more guidance for achieving the desired end result.

The system 300 workflow can be dynamically applied to the one or more activities or business components within the industrial environment though interaction with output component 310. Thus, output component 310 can be in communication with one or more enterprise components or control components that can be distributed throughout an industrial control environment or another type of environment.

As the workflow is implemented by MES Appliance 306, problems might be discovered though interfacing with various business components and/or by real-time collection component 304. Such problems can be analyzed by calculate component 312, such as by analyzing historical data relating to how a similar problem had been corrected or based on other logic. Calculate component 312 can recommend one or more changes to correct the problem. MES Appliance 306 can create another model to determine if the changes are acceptable. These changes can be automatically applied to carry out the desired functions. Information relating to the problems and/or changes can be communicated to a user, although this is not necessary.

The input component 308 can provide a graphical user interface (GUI), a command line interface, a speech interface, Natural Language text interface, and the like. For example, a GUI can be rendered that provides a user with a region or means to load, import, select, read, etc. the user input, and can include a region to present the results of the interpretation of the user input (e.g., information relating to how system 300 will implement the various actions). These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with input component 308 to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with some aspects, calculate component 312, MES Appliance 306 or other system components can be configured to solicit feedback from the user relating to the actions, steps or function points that are recommended to achieve the desired result. Such feedback can be requested to mitigate misunderstandings and/or obtain information relating to system 300 performance and recommended improvements, if any. Such feedback requests can be presented to a user through various means including a message (e.g., pop-up message, email message), a selectable input (e.g., answer to a question) or through other means. Such feedback can be solicited if a received input (e.g., goal, desired end result) is not clear or could be interpreted in two or more different ways, which might conflict with each other. For example, a user can request that a quality performance check be performed on a group of widgets. The system components might not know if measurements of the lengths, color, material strength and/or another quality check should be performed. A message can be sent to the user so that further clarification is provided (e.g., only check length and color). This type of feedback can also mitigate wasted resources such as time and costs associated with performing functions that are not necessary (e.g., checking material strength in the above example).

Thus, system 300 can receive a request to perform an action or a series of actions, which can be expressed as a high-level desired output, and can automatically implement the actions (e.g., workflow) while mitigating further user interaction, unless further clarification is necessary. As such, full functionalities of system 300 and related components can be utilized to increase productivity and automate a multitude of industrial processes.

Figure 4:
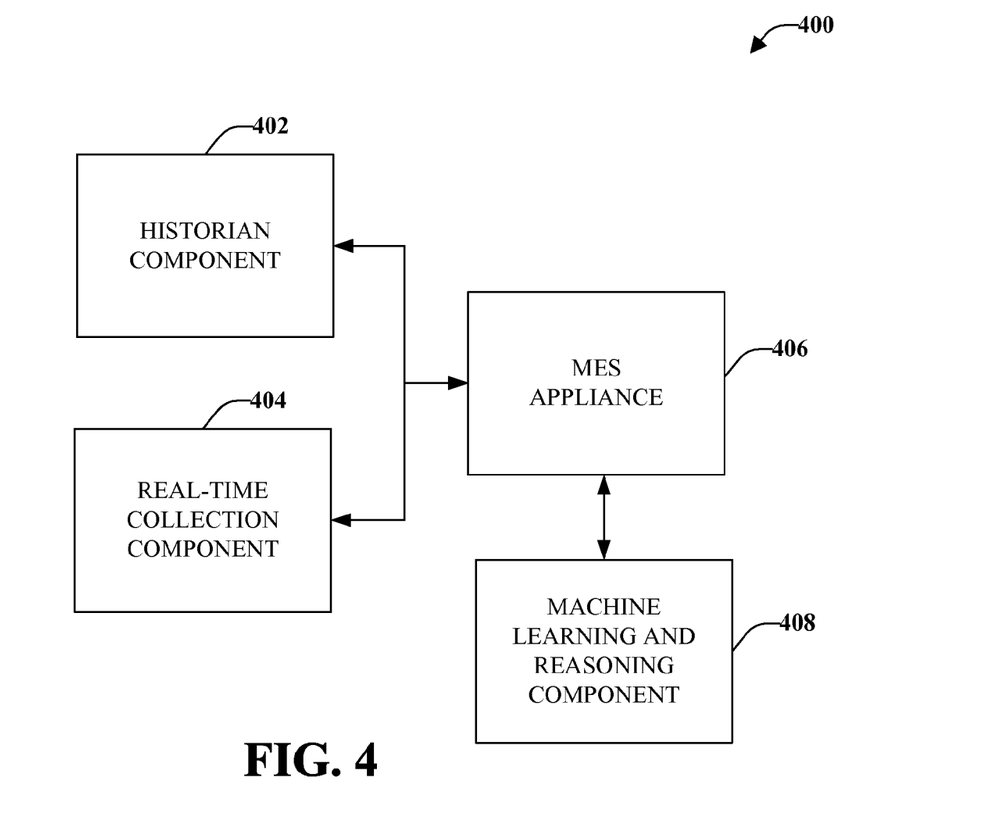
FIG. 4 illustrates a system that employs machine learning techniques that can facilitate interpreting a user program and exposing program elements as function points to extract the program as a single unit.

FIG. 4 illustrates a system 400 that employs machine learning techniques that can facilitate interpreting a user program and expose program elements as function points to extract the program as a single unit. The various aspects (e.g., in connection with receiving a desired output, simulating process steps that can be utilized to achieve the desired output, automatically implementing actions in accordance with a workflow, altering one or more process steps, and so forth) can employ various machine learning-based schemes for carrying out various aspects thereof.

System 400 includes a historian component 402 that retains information relating to historical data, business data, and various other information that can be captured and stored. A real-time collection component 404 can be configured to monitor current events within an industrial control environment. As a desired output is received by MES Appliance 406 information from the historian component 402 and/or real-time collection component 404 can be analyzed in order to automatically implement functions associated with achieving the desired end result.

Associated with MES Appliance 406 can be a machine learning and reasoning component 408 that can employ various machine learning techniques, algorithms, approaches, etc. to identify and/or implement actions (e.g., artificial intelligence, rules based logic and so forth). For example, the machine learning component 408 can employ a machine learning algorithm that can reason about or infer which historical information should be analyzed to determine process steps that can achieve a desired end result, simulation of various steps utilizing both historical and current data, and automatic implementation of process steps, which can be facilitated through an automatic classifier system and process. In another example, based in part on a simulation or actual events, process steps that should be modified (if any) can be determined and automatically applied can be facilitated through an automatic classifier system and process. Inference can be employed to identify actions that will produce a desired end result and/or can generate a probability distribution over the identified actions as potential process or workflow steps. Such inferences can be probabilistic—that is, the computation of a probability distribution over entities identified within the data. Inference can also refer to techniques employed for rendering higher-level decisions.

Various classification (explicitly and/or implicitly trained) schemes and/or systems (e.g., boosting classifiers, transduction classifiers, inductive classifiers, support vector machines, neural networks, expert systems, Bayesian belief networks, fuzzy logic, data fusion engines . . . ) can be employed in connection with performing automatic sequencing of activities and/or activity sets in accordance with the disclosed examples. In general, a classifier is a function that maps an input attribute vector, $x=(x1, x2, x3, x4, xn)$, to a confidence that the input belongs to a class, that is, $f(x)$ =confidence(class). Such classification can employ a probabilistic and/or statistical-based analysis (e.g., factoring into the analysis utilities and costs) to automatically differentiate text from other entities within an image. One example of a suitable classifier is a support vector machine (SVM), which, in general, operates by finding a hypersurface, which attempts to split triggering criteria from non-triggering criteria, in the space of possible inputs. This can make the classification suitable for testing samples, data, etc. that is near, but not identical to training data. The classifier(s) can be used to automatically learn and perform a number of functions, including but not limited to determining according to a received intent which process steps or function points to utilize, whether one or more actions need to be modified based on historical or current conditions, when to request feedback or further instructions, dynamically applying results of a simulation to one or more external or internal components, and so forth. The criteria can include, but is not limited to, receiving feedback based on performance or recommended activities or a sequence of activities described by the received intent, the type of activity, the machinery or other items (e.g., business components, control components, enterprise components) performing the activity, the importance of the activity, problems experienced with performing the activity and so forth.

In accordance with an alternate aspect, an implementation scheme (e.g., rule) can be applied to determine which actions to take (or not take) for performance of activities, automatic alteration of various machinery, enterprise components, control components, and so forth, selectively changing a process step (e.g., proceeding to a next step, implementing an alterative step). It will be appreciated that the rules-based implementation can automatically and/or dynamically modify various actions performed within an industrial control environment based upon a predefined desired intent and a simulation or prior knowledge of a workflow. In response thereto, the rule-based implementation can automatically determine a sequence to utilize to achieve the intent, assign one or more steps to various components and/or suggest alternative components to achieve the intent by employing a predefined and/or programmed rule(s) based upon any desired criteria (e.g., desired output, number of activities necessary, type of activities needed, activity length, activity importance, resource performing the activity, and so forth).

By way of example, a user can establish a rule that can require a trustworthy flag and/or certificate to utilize a workflow or component whereas, other components or workflows within a particular system may not require such security credentials. It is to be appreciated that any preference can be produced through predefined or pre-programmed forms of a rule. It is to be appreciated that the rules-based logic can be employed in addition to or in place of the artificial-based components and/or machine learning component 408. For example, an event that is rule-based can be triggered by a combination of factors, such as if there is a peg "x" plus a peg "y" in a certain place, both pegs can be integrated to create a peg "z".

Figure 5:
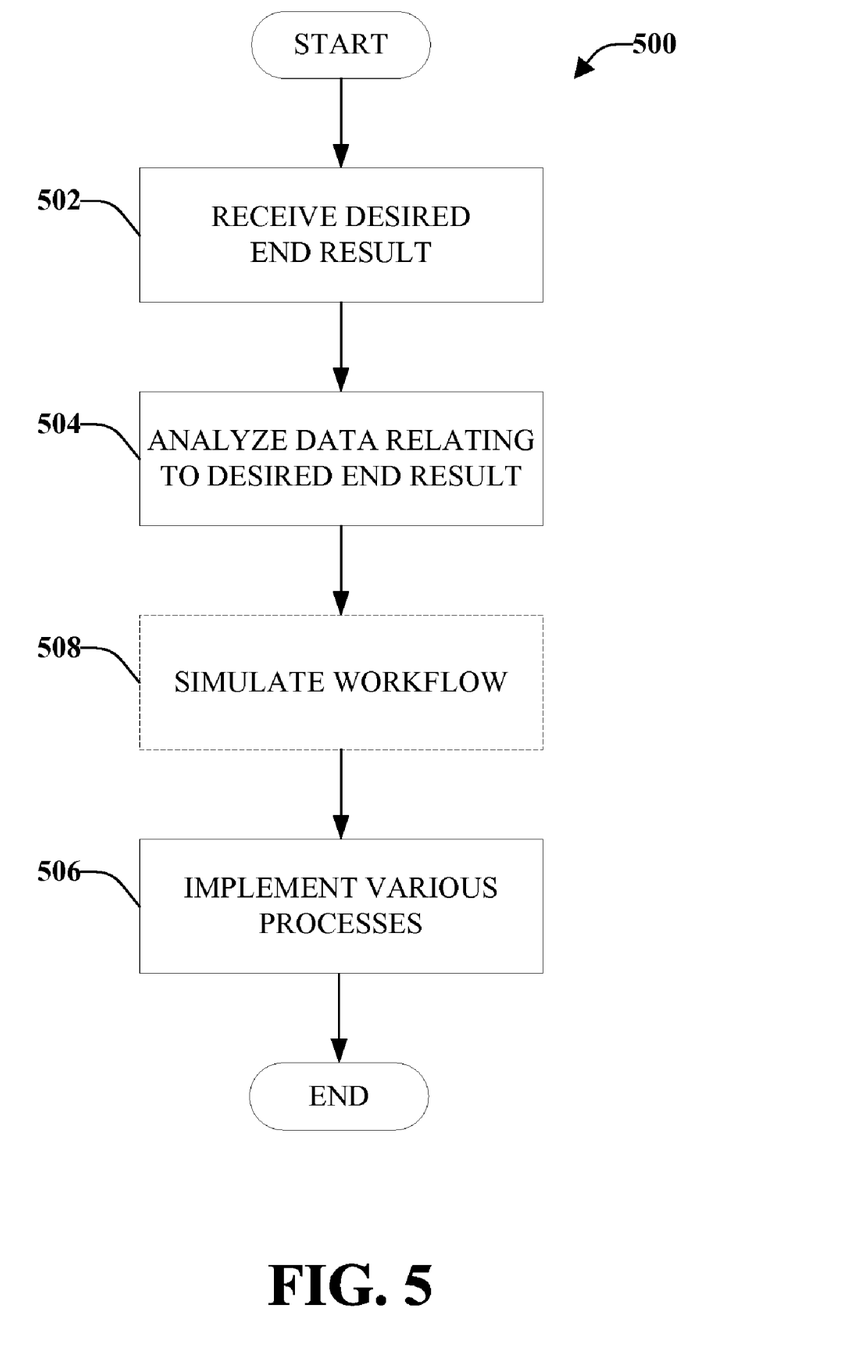
FIG. 5 illustrates a method for automatically configuring and implementing one or more processes in an industrial control environment.
Figure 6:
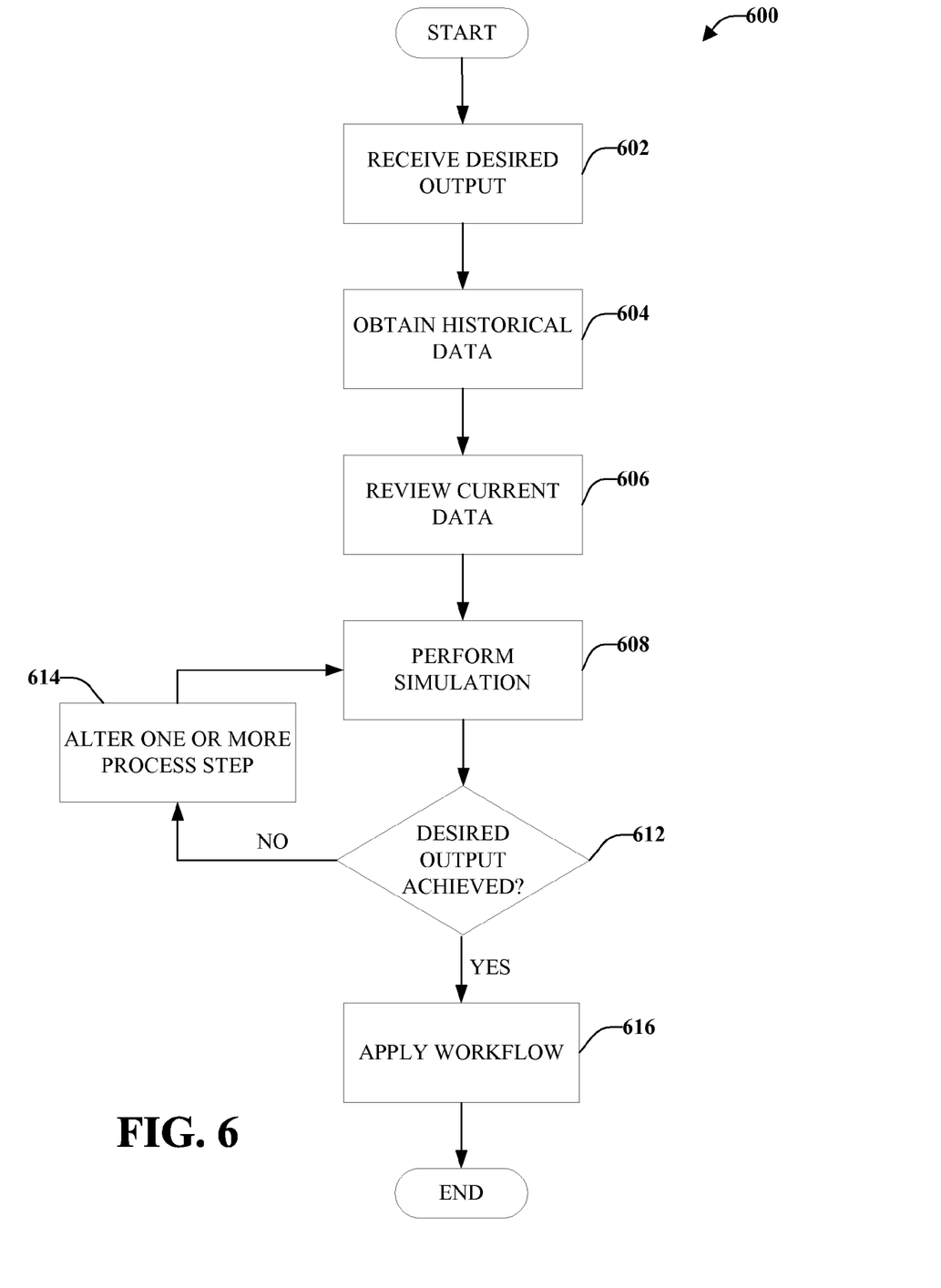
FIG. 6 illustrates another method for automatically configuring and implementing one or more processes in an industrial control environment.

In view of the exemplary systems shown and described above, methodologies that may be implemented in accordance with the disclosed subject matter, will be better appreciated with reference to the flow charts of FIGS. 5 and 6. While, for purposes of simplicity of explanation, the methodologies are shown and described as a series of blocks, it is to be understood and appreciated that the disclosed embodiments are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 5 illustrates a method 500 for automatically configuring and implementing one or more processes in an industrial control environment. Method 500 starts, at 502, when an input is received that includes a desired end result (e.g., "perform a quality check", "create product according to specifications", and so forth). The input can be expressed as a high-level overview or in other terms, such as a goal, outcome, best case scenario, desired result, end product and so forth and can include explicit details relating the desired end result. The input can be expressed in natural language format, input through a keyboard, spoken (e.g., audible), selected from a listed, communicated through drag-and-drop functionality (e.g., icons), or through other manners that can be understood by a PLC, computer, machine, or other devices.

Based on the input, data relating to the desired end result is analyzed at 504. Such analysis can be conducted based on key words or phrases contained in the input, the subject manner of the input, or other criteria that can be utilized to distinguish between various inputs and desired end results. The analysis can be performed on historical information, current information, or combinations thereof.

Based on the analysis, a workflow can be created that provides an order or sequence of various process steps that should be invoked to achieve the desired end result. At 506, the various processes or process steps are automatically implemented. Such implementation can include communicating with various components and/or machinery at a proper time and in a proper sequence. The implementation can also include observing the functions performed and analyzing the functions to determine if the desired end result is achieved and/or if there are one or more problems (e.g., component failure, bottleneck at a particular point in the workflow). If problems are discovered, changes can be automatically configured and applied.

In accordance with some aspects, prior to automatically implementing the processes, one or more workflows can simulated, as illustrated at 508. The simulation can be a model that includes one or more steps that might be implemented to achieve the desired end result. The model can consider the historical information and/or current information relating to the one or more steps. The model or simulation might reveal that one or more steps need to be modified, replaced, or added in order to achieve the desired end result. If such modifications are necessary, the changes are made to the simulation or model. The model or simulation can be changed a number of times, if necessary, until a determination is made whether the desired end result can be achieved. If the end result can be achieved, various processes are automatically implemented, at 508, throughout an industrial control environment or other environment utilizing the disclosed techniques. In accordance with some aspects, information is presented to a user that indicates the various processes that should be used to achieve the desired end result and the user determines whether to implement the processes.

FIG. 6 illustrates another method 600 for automatically configuring and implementing one or more processes in an industrial control environment. At 602, a desired output is received from a user and/or entity. Based on the desired output, historical data is obtained, at 604, and current data is received, at 606. Both the historical data and the current data can be captured by various machinery, enterprise components, control components, or other components, as well as though user input.

The historical data can be obtained and retained in accordance with an organizational model of a hierarchical system that is distributed across various elements of an enterprise. The model allows data identified for historian purposes to be automatically collected and also allows historian functionality to be exposed and thus efficiently integrated with other elements of an organization. Such elements include representations of data that are maintained on higher-level business servers and other representations that serve control elements such as programmable logic controllers and/or other industrial control components. A directory service operates with the organizational model to enable configuration of historian components within the organization and to enable data to be located within the organization. Common organization functionality such as security services can be distributed according to a data model and directory service.

The current data can be obtained by monitoring various process variables, as well as activity currently occurring within one or more areas or process steps. Such collection of data can be based on visual monitoring, such as by a camera, video recorder, vision system or other device that can capture pictures (still or moving), receiving a user input (e.g., key strokes, voice commands, and so forth) or can be another device that can readily monitor or perceive actions or events at substantially the same time as the actions or events occur. Some activities can be observed based on interaction with various components (e.g., machinery, PLCs, computers, and so forth).

At 608, a simulation based on the historical data, current data, and desired end result is conducted. The simulation can include creating a model or a conceptual view of one or more process steps that can be used to achieve the desired end result. As process steps are evaluated, a determination is made, at 612 whether the desired end result can be achieved. If the determination is that the desired end result cannot be achieved, such as if one or more steps are deemed undesirable and/or based on data collected from historian component and/or real-time collection component based on the current model ("NO") method 600 continues, at 614 with one or more process steps are altered or other adjustments are automatically made. The adjustments are feedback and a new simulation is performed, at 608. It is to be understood that this act can be continuous such that any number of modifications can be made and new simulations performed.

If the determination, at 612, is that the current model, which can be one or more altered models, can achieve the desired end result ("YES"), method 600 continues, at 616, when the workflow is automatically applied within an industrial control process based in part on the simulation results. The simulation results can be captured as a workflow that includes a sequence of steps. This sequence of steps can be automatically invoked though interaction with various machinery, components, or other items that are configured to implement a particular step in the sequence. Automatic implementation of the workflow steps helps mitigate the human intervention involved while carry out part or all of the business logic associated with the overall workflow. It can also mitigate the amount of downtime, scrap, and other wasted resources and inefficiencies as a direct result of poor planning.

Figure 7:
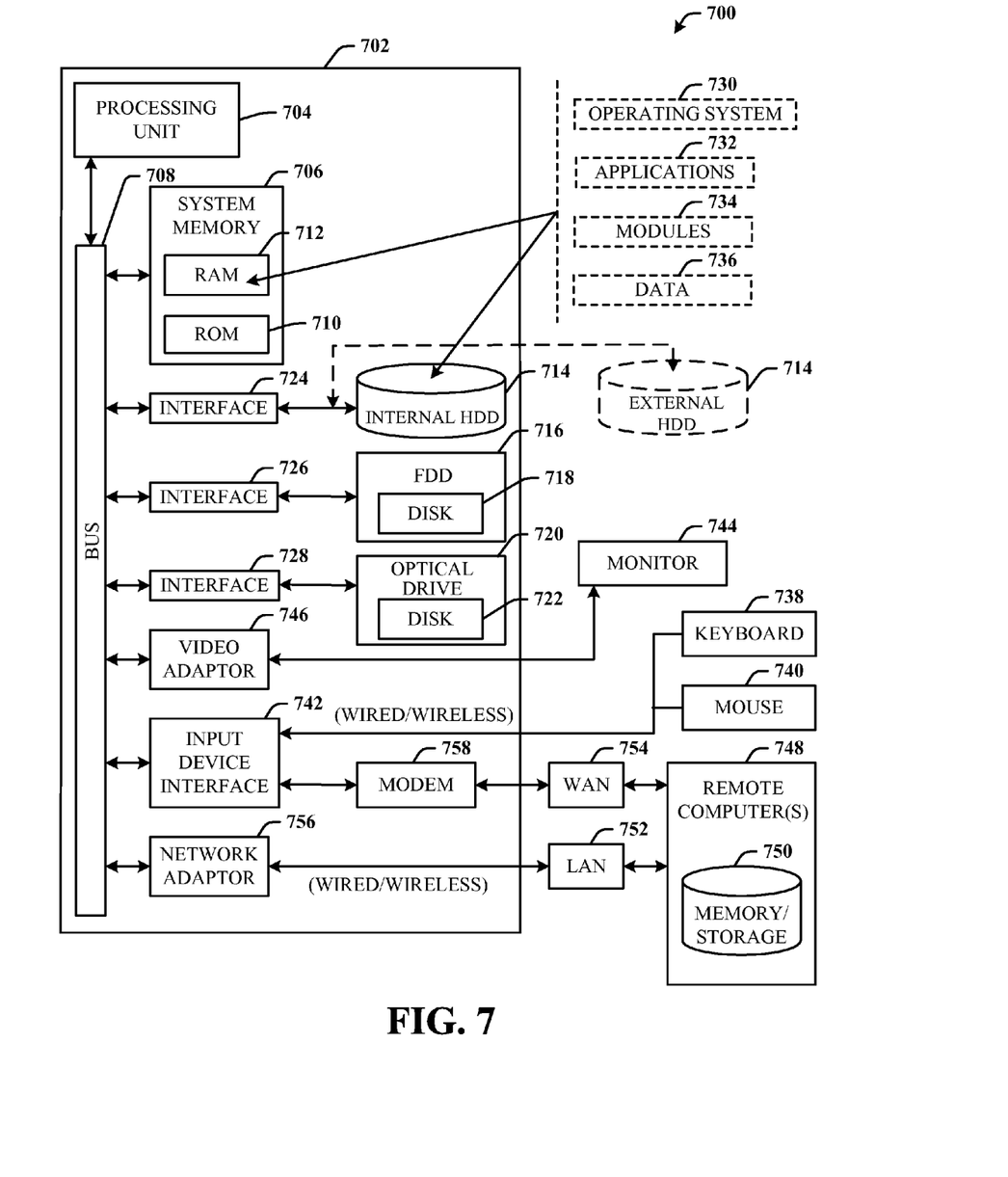
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects disclosed herein, FIG. 7 and the following discussion are intended to provide a brief, general description of a suitable computing environment 700 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1374 interface technologies. Other external drive connection technologies are within contemplation of the one or more embodiments.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the various embodiments can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 through an interface, such as a video adapter 746. In addition to the monitor 744, a computer typically includes other peripheral output devices (not shown), such as speakers, printers, etc.

The computer 702 may operate in a networked environment using logical connections through wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adaptor 756 may facilitate wired or wireless communication to the LAN 752, which may also include a wireless access point disposed thereon for communicating with the wireless adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 through the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
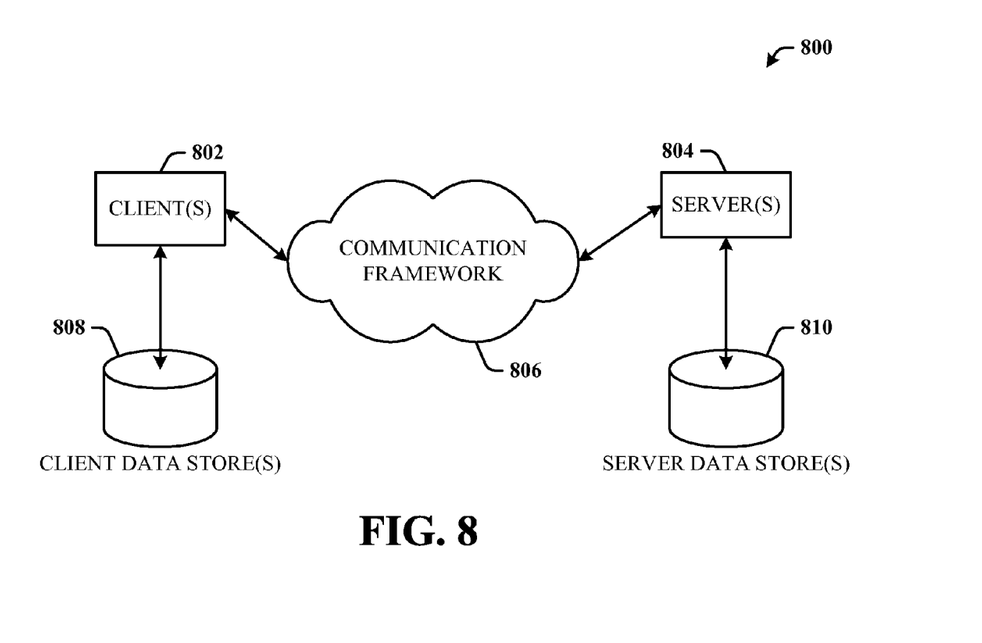
FIG. 8 illustrates a schematic block diagram of an exemplary computing environment in accordance with the various embodiments.

Referring now to FIG. 8, there is illustrated a schematic block diagram of an exemplary computing environment 800 in accordance with the various embodiments. The system 800 includes one or more clients 802. The client(s) 802 can be hardware and/or software (e.g., threads, processes, computing devices). The client(s) 802 can house cookie(s) and/or associated contextual information by employing the various embodiments, for example.

The system 800 also includes one or more servers 804. The servers 804 can also be hardware and/or software (e.g., threads, processes, computing devices). The servers 804 can house threads to perform transformations by employing the various embodiments, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated through a wired (including optical fiber) and/or wireless technology. The client(s) 802 are operatively connected to one or more client data stores 808 that can be employed to store information local to the client(s) 802 (e.g., cookie(s) and/or associated contextual information). Similarly, the server(s) 804 are operatively connected to one or more server data stores 810 that can be employed to store information local to the servers 804.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims. The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), and so forth), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

What is claimed is:

1. An automatic configuration system in an industrial automation environment, comprising:
    a historian component that compiles historical data related to a process;
    a real-time collection component that monitors at least one of one or more process variables related to the process or activity related to the process;
    an input component that receives a user desired result related to the process;
    a manufacturing execution system (MES) Appliance that simulates a plurality of process steps to achieve the user desired result based on the historical data and the at least one of one or more process variables related to the process or activity related to the process, the MES Appliance at least one of:
    upon determining the user desired result is possible based upon the simulated plurality of process steps, creates a workflow to achieve the user desired result comprising multiple process steps from the simulated plurality of process steps and automatically implements the workflow; or
    upon determining the user desired result is not possible based upon the simulated plurality of process steps, solicits additional user input to achieve the user desired result.

2. The system of claim 1, wherein the MES Appliance upon identifying an issue implementing the workflow performs another simulation of the plurality of process steps and dynamically alters the workflow to achieve the user desired result.

3. The system of claim 1, wherein the desired result is expressed as a natural language input.

4. The system of claim 2, farther comprises a calculate component that determines a change to one or more process steps associated with the workflow to achieve the desired result, the determined change is communicated to the MES Appliance.

5. The system of claim 1, wherein the additional user input is at least one of a modification to the user desired result or guidance for achieving the user desired result.

6. The system of claim 1, wherein the MES Appliance conveys the simulation results to the historian component for storage and future analysis.

7. The system of claim 1, wherein the MES Appliance evaluates one or more simulated process steps that can be employed to achieve the user desired results and modifies a simulated process step to achieve the user desired result.

8. The system of claim 1, wherein the historian component and real-time collection component are distributed in an industrial control environment.

9. The system of claim 1, further comprising a machine learning component that facilitates automation of one or more system components.

10. A method for automatically configuring one or more processes in an industrial control environment, comprising:
   receiving a desired end result;
   analyzing data relating to the desired end result;
   simulating a plurality of process steps that can be used to achieve the desired end result;
   creating a workflow that achieves the desired end result using multiple process steps from the simulated plurality of process steps; and
   automatically implementing the workflow in an industrial control environment to achieve the desired end result.

11. The method of claim 10, wherein analyzing data relating to the desired end result comprising:
   obtaining historical data; and
   monitoring one or more current conditions within the industrial control environment.

12. The method of claim 10, wherein the desired end result is received as a user provided natural language input.

13. The method of claim 10, further comprising:
   determining if the implemented workflow can achieve the desired end result; and
   simulating and modifying one or more process steps of the workflow when the workflow can not achieve the desired end result.

14. The method of claim 10, further comprises displaying information relating to the workflow to a user.

15. The method of claim 10, further comprising:
   determining through the simulation of plurality of process steps that the desired end result is not achievable; and
   requesting feedback information to at least one of modify the desired end result or guidance to achieve the desired end result.

16. The method of claim 15, farther comprising incorporating the feedback information into the simulation.

17. The method of claim 10, further comprises conveying the workflow to a repository for storage and future analysis.

18. A machine execution system that facilitates implementation of one or more processes to achieve a stated result, comprising:
   means for accepting an indication of a desired result;
   means for obtaining and analyzing historical and current information relating to the desired result;
   means for simulating a plurality of process steps to achieve the desired result and creating a workflow to achieve the desired result using multiple of the simulated plurality of process steps based in part on the analyzed information; and
   means for automatically implementing at least one process step included in the workflow.

19. The system of claim 18, wherein the means for simulating and creating requests user input to modify the desired result or to provide guidance on achieving the desired result.

20. The system of claim 19, wherein the desired result is provided as a natural language input.

* * * * *

UNITED STATES PATENT AND TRADEMARK OFFICE
CERTIFICATE OF CORRECTION

| | | |
|---|---|---|
| PATENT NO. | : 7,643,892 B2 | Page 1 of 1 |
| APPLICATION NO. | : 11/864376 | |
| DATED | : January 5, 2010 | |
| INVENTOR(S) | : Crisler Terrill Moor et al. | |

It is certified that error appears in the above-identified patent and that said Letters Patent is hereby corrected as shown below:

IN THE CLAIMS:

In Column 18, Line 53, in Claim 4, delete "farther" and replace with "further".

In Column 20, Line 9, in Claim 16, delete "farther" and replace with "further".

Signed and Sealed this

Twentieth Day of April, 2010

David J. Kappos
*Director of the United States Patent and Trademark Office*